(12) United States Patent
Kadirkamanathan

(10) Patent No.: US 8,935,170 B2
(45) Date of Patent: Jan. 13, 2015

(54) SPEECH RECOGNITION

(71) Applicant: Longsand Limited, Cambridge (GB)

(72) Inventor: Maha Kadirkamanathan, Cambridge (GB)

(73) Assignee: Longsand Limited (GB)

( * ) Notice: Subject to any disclaimer, the term of this patent is extended or adjusted under 35 U.S.C. 154(b) by 214 days.

(21) Appl. No.: 13/686,491

(22) Filed: Nov. 27, 2012

(65) Prior Publication Data

US 2014/0149113 A1 May 29, 2014

(51) Int. Cl.
*G10L 15/00* (2013.01)
*G10L 15/14* (2006.01)
*G10L 15/26* (2006.01)
*G10L 15/28* (2013.01)

(52) U.S. Cl.
CPC .............. *G10L 15/144* (2013.01); *G10L 15/26* (2013.01); *G10L 15/285* (2013.01)
USPC .......... 704/256.4; 704/256; 704/231

(58) Field of Classification Search
USPC ............. 704/231, 232, 243, 256–256.8
See application file for complete search history.

(56) References Cited

U.S. PATENT DOCUMENTS

| | | | | |
|---|---|---|---|---|
| 5,129,002 A * | 7/1992 | Tsuboka | | 704/246 |
| 6,064,958 A * | 5/2000 | Takahashi et al. | | 704/243 |
| 6,466,908 B1 * | 10/2002 | Baggenstoss | | 704/256 |
| 7,454,342 B2 * | 11/2008 | Nefian et al. | | 704/256 |
| 7,680,664 B2 * | 3/2010 | Liu et al. | | 704/256.2 |
| 2004/0230420 A1 | 11/2004 | Kadambe et al. | | |
| 2008/0059183 A1 * | 3/2008 | Liu et al. | | 704/256 |
| 2009/0055182 A1 * | 2/2009 | He et al. | | 704/256.2 |
| 2009/0055183 A1 * | 2/2009 | Yakhnenko et al. | | 704/256.5 |
| 2011/0137650 A1 * | 6/2011 | Ljolje | | 704/236 |
| 2011/0218804 A1 | 9/2011 | Chun | | |
| 2011/0288862 A1 | 11/2011 | Todic | | |
| 2012/0101817 A1 * | 4/2012 | Mocenigo et al. | | 704/231 |
| 2012/0101820 A1 * | 4/2012 | Ljolje | | 704/240 |
| 2013/0185070 A1 * | 7/2013 | Huo et al. | | 704/243 |

OTHER PUBLICATIONS

Bourlard, H. et al.; "Hybrid HMM/ANN Systems for Speech Recognition: Overview and New Research Directions"; 1997; 29 pages.
Lamel, L. et al.; "Investigating Lightly Supervised Acoustic Model Training"; 2001; 4 pages.
Prahallad, K. et al.; "Handling Large Audio Files in Audio Books for Building Synthetic " Voices ; 2010; 6 pages.
C. Tarnas et al, Reduced Space Hidden Markov Model Training, Bioinformatics, vol. 14, No. 5, Jun 1, 1998, pp. 401-406, XP055103537, ISSN: 1367-4803 DOI: 10. 1093/bioinformatics/14. 5.401 abstract, p. 402 right col.-p. 403 right.

(Continued)

*Primary Examiner* — Douglas Godbold

(57) ABSTRACT

A speech recognition system, according to an example embodiment, includes a data storage to store speech training data. A training engine determines consecutive breakout periods in the speech training data, calculates forward and backward probabilities for the breakout periods, and generates a speech recognition Hidden Markov Model (HMM) from the forward and backward probabilities calculated for the breakout periods.

13 Claims, 5 Drawing Sheets

(56) References Cited

OTHER PUBLICATIONS

International Searching Authority, The International Search Report and the Written Opinion, Mar. 25, 2014, 14 Pages.

Rastislav AA RA Mek et al: "On-Line Viterbi Algorithm for Analysis of Long Biological Sequences", Sep. 8, 2007, Algorithms in Bioinformatics: [Lecture Notes in Computer Science]Springer, Berlin, Heidelberg.

* cited by examiner

SPEECH RECOGNITION

BACKGROUND

Typical speech recognition systems include software that generates text from audio. Speech recognition software often uses training to tune its transcription from audio to text. In some cases a user may read predetermined text known by the speech recognition software so the speech recognition software can fine tune the recognition of that person's speech. In many instances, the user may not be available to read a short paragraph of predetermined text to fine tune the speech recognition software. For example, it is not uncommon for speech recognition services to receive large audio files for transcription. Very long television broadcasts may be provided for transcription and that large audio file becomes the training material.

BRIEF DESCRIPTION OF DRAWINGS

The embodiments are described in detail in the following description with reference to examples shown in the following figures.

DETAILED DESCRIPTION OF EMBODIMENTS

Figure 1:
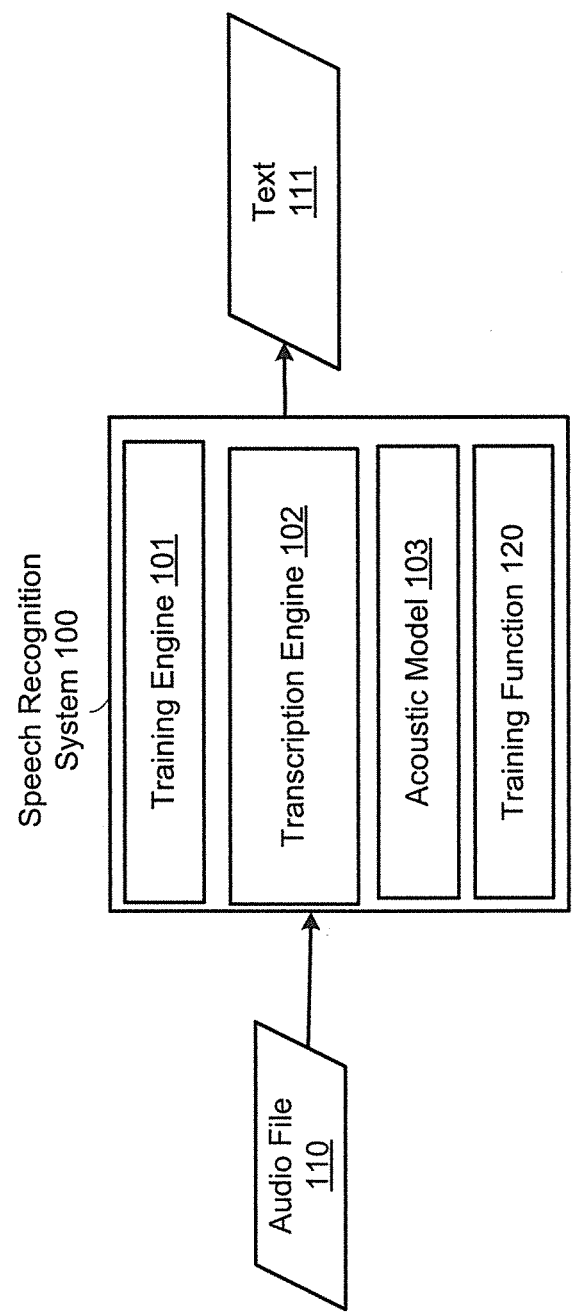
FIG. 1 illustrates a speech recognition system.

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

According to an embodiment, a speech recognition system utilizes a training function to generate Hidden Markov Models (HMMs) for transcribing audio into text. The training function is statistical in nature, and the speech recognition system acoustic model may be trained from spoken words and sentences provided in a large audio file that is to be transcribed.

The speech recognition system can use the large audio file for training without breaking up the large audio file into multiple smaller audio files. Some speech recognition systems break up large audio files into smaller audio files for manageability. For example, due to a limited amount of memory and other computer resources, a large audio file may be broken up into 3-5 minute chunks for training. However, as the audio file is broken up so are the associated text files so that they make multiple audio-transcript-text pairs. Breaking up an audio file and creating the corresponding text pairs can be error prone and time-consuming and may require a specialist. The speech recognition system according to an embodiment can use a large audio file, which may be greater than 5 minutes or greater than 10 minutes or even greater than 30 minutes in length for training without breaking up the file.

The speech recognition system may generate HMMs for transcribing audio to text. The speech recognition system generates and refines the HMMs through training, and uses the HMMs for transcription. HMMs utilize probability density functions (pdfs), which relate to the probability of an observation represented by an acoustic vector being related to a word or part of a word. Generally, the probability distribution is a Gaussian distribution in n-dimensional space. The shape and position of the Gaussian distribution is defined by its mean and variance. These parameters are determined during training and are the model parameters for the HMMs. Once the model parameters have been determined for the HMMs, the HMMs can be used to determine the likelihood of a sequence of observations corresponding to a sequence of words or parts of words. The method is applicable to both discrete probability HMMs as well as continuous probability density HMMs, particularly mixture Gaussian HMMs. The description that follows generally refers to continuous probability density Gaussian HMMs, but it should be understood that discrete probability HMMs as well as continuous probability mixture Gaussian HMMs are also within the scope of this disclosure.

An HMM may output a sequence of n-dimensional real-valued vectors (with n being a small integer, such as 10), such as every 10 milliseconds (ms) for speech being transcribed. The vectors include cepstral coefficients, which may be obtained by taking a Fourier transform of a short time window of speech (e.g., 10 ms) and decorrelating the spectrum using a cosine transform, then taking the first (most significant) coefficients. The HMM tends to have in each state a statistical distribution that is a diagonal covariance Gaussian, which will give a likelihood for each observed vector. Each word, or each phoneme, has a different output distribution. An HMM for a sequence of words or phonemes may be generated by concatenating individual trained HMMs for the words and phonemes. So, the HMMs may predict the current state to estimate the phoneme or word for the speech.

The training function for the speech recognition system trains the HMMs. The training function may perform the following: (1) calculate forward and backward probabilities for training data comprising speech; (2) calculate the accumulates for the HMM parameters for the training data based on the forward and backward probabilities; and (3) re-estimate the value for each model parameter at the end of each iteration. The Baum-Welch algorithm generally describes (1)-(3). However, according to an embodiment, for (1), which includes calculating forward and backward probabilities for the training data, the probabilities are calculated for breakout periods which is not done by the Baum-Welch algorithm. Also, convergence times are determined in the training data which is also not done in the Baum-Welch algorithm.

The calculation of the forward and backward probabilities from the training data in the large audio file can be performed without breaking up the audio file into smaller audio files. For example, consecutive breakout points are selected within the audio file. The time period between each breakout point is referred to as a breakout period. By way of example, the breakout periods could be as long as 3-5 minutes or as short as 3-5 seconds in length. Other lengths may be used. Forward probabilities are calculated up to a breakout point and scaled backward probabilities are calculated starting from the breakout point and moving backwards based on the calculated forward probabilities for the breakout period.

Based on the calculated forward and scaled backward probabilities for at least some of the breakout periods, a convergence time in the audio training data is determined. The convergence time may include a point in time in the audio file when scaled backward probabilities calculated for some of the breakout periods stop changing. Once the convergence time is identified, future breakout passes for future breakout periods do not need to process beyond the convergence time, which saves processing time and memory. Multiple convergence times may be identified in the audio file.

FIG. 1 illustrates a speech recognition system 100. The system 100 includes a training engine 101, transcription engine 102, and acoustic model 103. An input to the speech recognition system 100 is speech. The speech may be provided in an audio file 110. The audio file 110 may be provided in a format, such as .WAV, .MP3, etc. The audio file 110 may be a large audio file, which may include speech exceeding 30 minutes in length. In one example, the audio file 110 may include speech greater than or equal to 1 hour in length.

The training engine 101 uses the speech in the audio file 110 as training data and uses a training function 120 to generate the acoustic model 103. The acoustic model 103 for example comprises HMMs. For example, phonemes, which are sounds in a language, are modeled by the HMMs. The training engine 101 generates the HMMs from the training data using the training function 120. The embodiments described in detail below describe the training function 120 executed by the training engine 101 to generate the acoustic model 103 comprised of HMMs.

The training engine 101 estimates model parameters for the HMMs to train the HMMs, which can be on-going. The trained HMMs are used by the transcription engine 102 to determine which speech components are present in speech to transcribe the speech to text. Text transcribed from speech in the audio file 110 is shown as 111 in FIG. 1.

Figure 2:
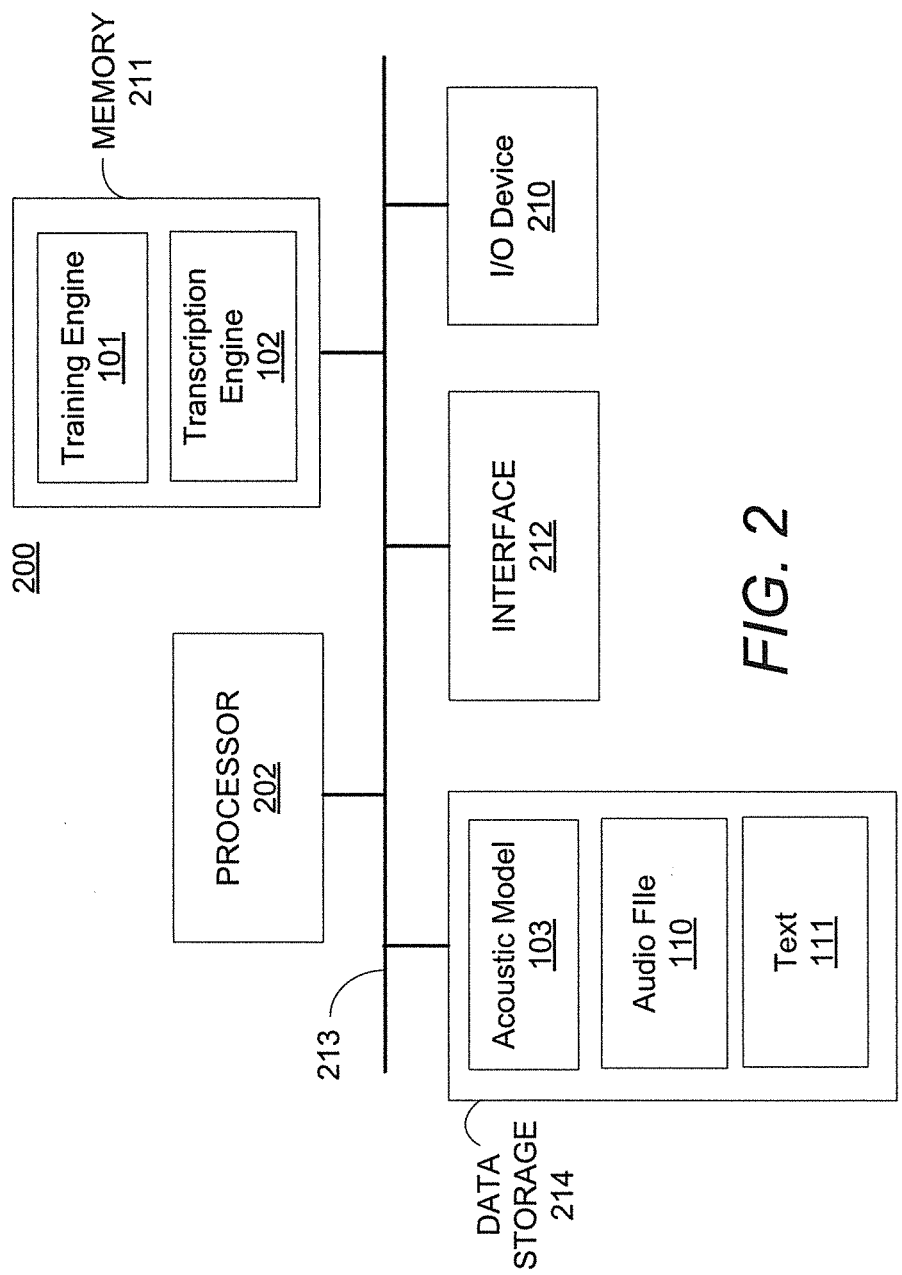
FIG. 2 illustrates a computer system that may be used for the speech recognition system.

FIG. 2 illustrates a computer system 200 that may be used as a platform for the system 100. The computer system 200 may execute, by one or more processors or other hardware processing circuits, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 200 includes a processor 202 that may implement or execute machine readable instructions performing some or all of the methods, functions and other processes described herein. Commands and data from the processor 202 are communicated over a communication bus 213. The computer system 200 also includes data storage to store machine readable instructions and data. The data storage may include volatile and/or non-volatile data storage. For example, the computer system 200 includes memory 211 storing machine readable instructions for the training engine 101 and the transcription engine 102 at runtime. The memory 211 may also store data used by the training engine 101 and the transcription engine 102 at runtime. Data storage 214 may comprise non-volatile data storage storing the audio file 110, the acoustic model 103, the text 111 and other information.

The computer system 200 may include an I/O device 210, such as a keyboard, a mouse, a display, etc. For example, the I/O device 210 includes a display for displaying the text 111 transcribed by the system 100. The I/O device 210 may include a microphone to receive speech that may be transcribed by the system 100. The computer system 200 includes an interface 212. The interface 212 may be a network interface, which may receive audio files and send data including text transcribed from speech. The interface 212 may include a universal serial bus interface or another type of interface that allows devices to connect to the computer system 200.

The training engine 101 shown in FIG. 1 uses the training function 120 to generate the HMMs for the acoustic model 103. The training function 120, for example, comprises a modified version of the Baum-Welch algorithm. The training function 120 (1) calculates forward and scaled backward probabilities for training data; (2) calculates the accumulates for the HMM parameters for the training data based on the forward and backward probabilities; and (3) re-estimates the value for each model parameter at the end of each iteration. Regarding calculating forward and scaled backward probabilities for training data, the training function 120 according to an embodiment efficiently calculates items in (1), such as the forward and scaled backward probabilities, for very long speech data in a break-out fashion. Examples of equations for calculating items in (1) related to the forward and backward probabilities for training data, in accordance with an embodiment, are now described.

Let $O=\{o_1 o_2 o_3 o_4 \ldots o_T\}$ be the observation sequence and $Q=\{q_1 q_2 q_3 q_4 \ldots q_T\}$ be the corresponding underlying state sequence for the Hidden Markov Model M containing N distinct states, defined by a set of initial probabilities $\{\pi\}$, transition probabilities $\{a\}$ and observation probability function $b(x)$ where x is an observation vector. The forward probability terms $\alpha_t(j)$ and the backward probability terms $\beta_t(j)$ in the training function 120 and also described in the Baum-Welch algorithm are defined as:

$$\alpha_t(j) = P(o_1 o_2 o_3 \ldots o_t, q_t = J | M), \quad (1)$$

$$\beta_t(j) = P(o_{t+1} o_{t+2} \ldots o_T | q_t = J, M), \quad (2)$$

leading to the recursions $$\alpha_{t+1}(j) = \sum_{i=1}^{N} \alpha_t(i) \cdot a_{ij} \cdot b_j(o_{t+1}), \quad (3)$$

$$\beta_t(j) = \sum_{i=1}^{N} \beta_{t+1}(i) \cdot a_{ji} \cdot b_i(o_{t+1}), \quad (4)$$

with boundary conditions $$\alpha_0(i) = \pi_i \quad (5)$$

$$\beta_t(i) = 1 \text{ for } 0 \leq i \leq N. \quad (6)$$

The total observation probability for the sequence is $$P(O|M) = \sum_{i=0}^{N} \alpha_t(i) \cdot \beta_t(i) \quad (7)$$

for any $$1 \leq t \leq T.$$

The training function 120 uses a scaled breakout backward probability where the traditional backward probability is scaled by the observation probability up to time t as follows, which is not done by the Baum-Welch algorithm:

$$\beta'_t(j) = \frac{\beta_t(j)}{\sum_{i=1}^{N} \alpha_T(i)} \quad (8)$$

If the audio file 110 is large, T will be very large and can lead to overflowing memory, such as the memory 211, when storing the forward and backward probability terms. The training function 120 uses a break-out point at time s where t<s<T to mitigate memory overflow. At the break-out point s, a partial data sequence $O_s=\{o_1 o_1 o_2 o_3 o_4 \ldots o_s\}$ is considered. Break-out points are not used by the Baum-Welch algorithm.

A break-out backward coefficient determined by the training function 120 is $$\beta_{ts}(j) = \sum_{i=1}^{N} \beta_{t+1s}(i) \cdot \alpha_{ji} \cdot b_j(o_{t+1}), \quad (9)$$

$$\beta_{ss}(i) = 1 \text{ for all } i. \quad (10)$$

Hence the total observation probability up to time s is $$P(O_s \mid M) = \sum_{i=1}^{N} \alpha_s \cdot (i). \quad (11)$$

The training function 120 determines a scaled breakout backward coefficient whereby the traditional backward probability is scaled by the observation probability up to time s.

$$\beta'_{ts}(j) = \sum_{i=1}^{N} \beta'_{t+1s}(i) \cdot \alpha_{ji} \cdot b_j(o_{t+1}), \quad (12)$$

$$\beta'_{ss}(i) = \frac{1}{\sum_{i=1}^{N} \alpha_s(i)}. \quad (13)$$

Due to the first order state dependency nature of the HMMs, $\beta'_{ts}(j)$ converges to $\beta'_{t}(j)$ as the gap between s and t increases. This is leveraged in the break-out forward-backward step of the training function 120. These convergence points can be identified in the audio file 110 and are used to minimize the amount of processing performed to determine the scaled backward probabilities, which are used to determine the model parameters for the HMMs. Once $\beta'_{t}(j)$ is computed, $\beta_t(j)$ can be calculated using an inverted equation (8). In one example, the scaled backward probabilities are stored and the backward probabilities do not need to be calculated and stored, which helps to minimize memory overflow.

The re-estimation formulae for the HMMs can be derived based on the scaled backward probabilities without the need to calculate unscaled backward probabilities. The HMM model parameters are:

State means π
State variances [σ²]
State transition probabilities a
Initial state probabilities π

From (7) and (8) the occupancy of each observation at time t given a state denoted by $L_t(i)$ leads to $$L_t(i)=P(q_t=i|O,M)=\alpha_t(i)\cdot\beta'_t(i) \quad (14)$$

The re-estimation formulae for Gaussian state Hidden Markov models are as below:

$$\hat{\mu}_i = \frac{\sum_{t=1}^{T} L_t(i) \cdot o_t}{\sum_{t=1}^{T} \sum_{j=1}^{N} L_t(j)} \quad (15)$$

$$[\sigma^2]_i = \frac{\sum_{t=1}^{T} L_t(i) \cdot (o_t - \hat{\mu}_i)(o_t - \hat{\mu}_i)^T}{\sum_{t=1}^{T} \sum_{j=1}^{N} L_t(j)} \quad (16)$$

Where $()^T$ denotes a transposition operation on a vector.

Let $L_t(i,j)$ be the joint occupancy involving a transition from state i to state j at time t.

$$L_t(i,j)=P(q_t=i,q_{t+1}=j|O,M)=\alpha_t(i)\cdot a_{ij}\cdot b_j(O_{t+1})\cdot\beta'_{t+1}(j) \quad (17)$$

The re-estimation formula for the state transition probabilities is as below:

$$\hat{a}_{ij} = \frac{\sum_{t=1}^{T-1} L_t(i, j)}{\sum_{t=1}^{T-1} \sum_{k=1}^{N} L_t(i, k)} \quad (18)$$

The initial probability for each state is calculated as below:

$$\hat{\pi}_i = \frac{L_1(i)}{\sum_{j=1}^{N} L_1(j)}. \quad (19)$$

Figure 3:
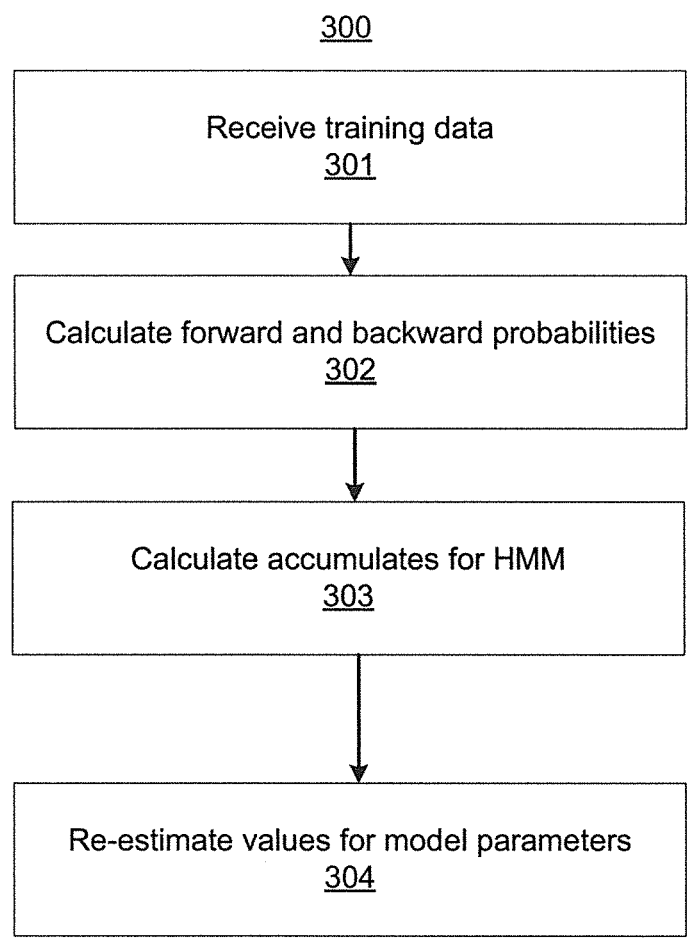
FIGS. 3-4 illustrate methods.

FIG. 3 shows a method 300 for training speech recognition HMMs. The method 300 and the method 400 described below are described by way of example with respect to the speech recognition system 100 shown in FIG. 1 but the methods may be performed by other systems. For example, the method 300 may be used to generate HMMs for the acoustic model 103 shown in FIG. 1. At 301, training data is received at the speech recognition system 100. The training data may be provided in audio file, such as the audio file 110. The training data may include a large audio file for example with speech longer than 1 hour. At 302, the training engine 101 calculates forward and scaled backward probabilities for consecutive breakout periods in the training data. Equations for calculating the forward and scaled backward probabilities for breakout periods are described above. Also, additional details for 302 are described below with respect to the method 400.

At 303, the training engine 101 calculates accumulates for the HMM model parameters based on the forward and the scaled backward probabilities. A feature set is determined from the accumulates. At 304, the training engine 101 re-estimates the values for the model parameters. These parameters are initial state probabilities, state transition probabilities and state observation parameters. The state observation parameters are a discrete probability distribution in case of discrete HMMs and mixture Gaussian parameters in case of a continuous HMM.

Figure 4:
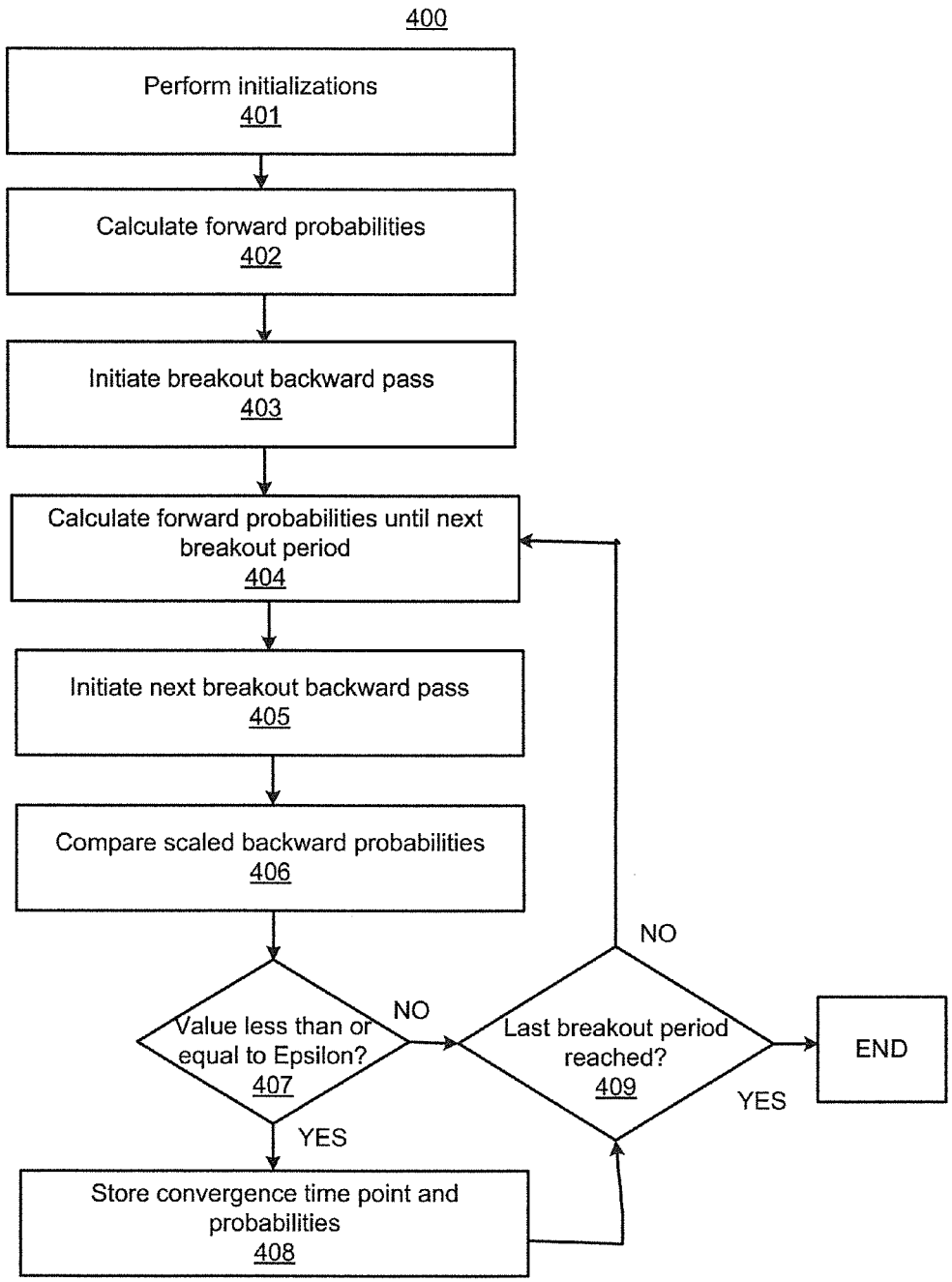

FIG. 4 shows a method for calculating forward and scaled backward probabilities for consecutive breakout periods in the training data. The method 400 may be performed for 302 in the method 300. The method 300 may be performed by the training engine 101 shown in FIG. 1.

Figure 5:
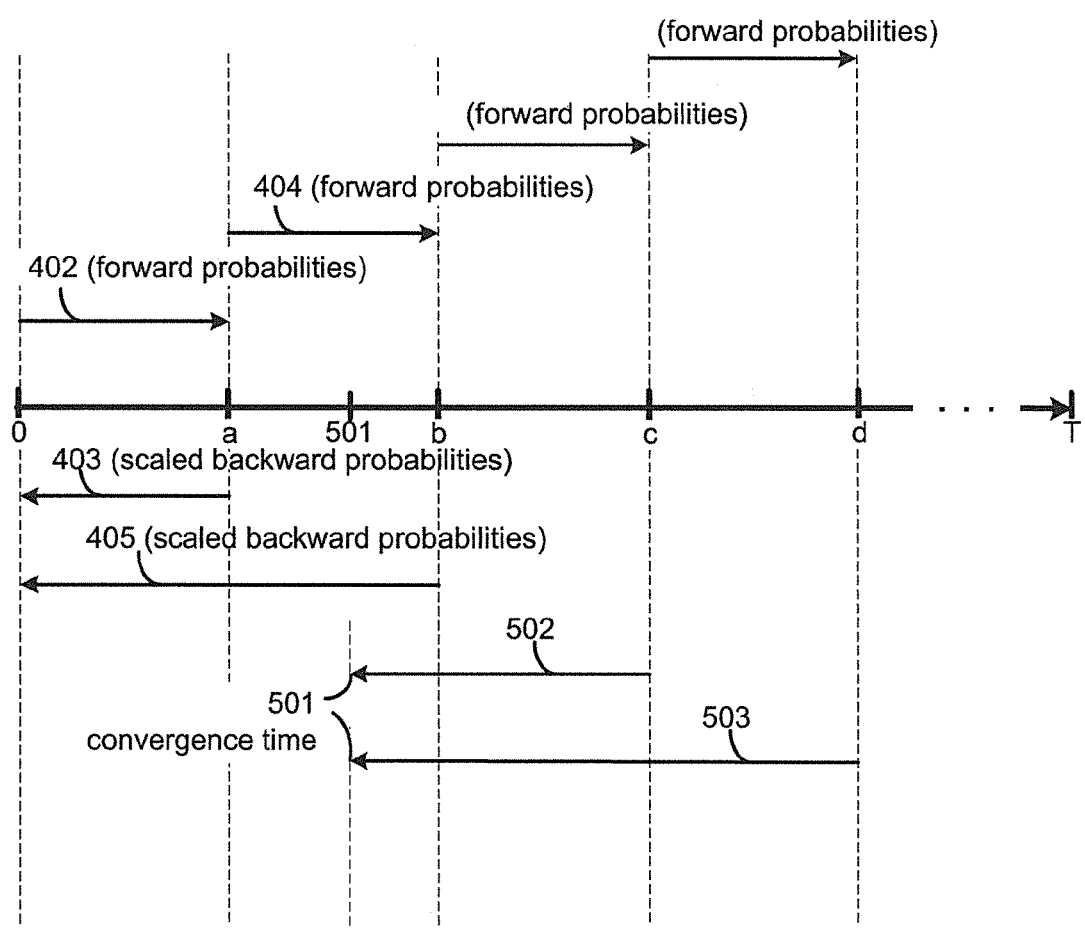
FIG. 5 illustrates an example of breakout periods in speech training data and illustrates calculating probabilities for different breakout periods.

At 401, initializations are performed. For example, the forward probability for time t is set to 0 and the convergence time is set to 0. Also, consecutive breakout periods are set in the training data. The length of the breakout periods can be set to 3 minutes, 5 minutes or other lengths. FIG. 5 shows a timeline of training data from 0 to T, where 0 is when the speech in the training data begins and T is when the speech ends. The breakout periods are shown as "a", "b", "c" . . . .

At 402, the forward probabilities are calculated according to equation (3) for a number of consecutive time instances from time 0 until the first breakout period, which is shown as "a" in FIG. 5. In one example, the time instances are every 10 ms. However, other lengths may be selected.

At 403, once the first breakout period has been reached, a breakout backward pass is initiated. At 404, in response to initiation of the breakout backward pass, the scaled breakout backward probabilities are calculated from "a" to the convergence time according to equation (12). The convergence time in the first breakout backward pass is 0. The scaled breakout backward probabilities are stored.

At 404, the forward probabilities are calculated until the next breakout period (e.g., s+1) is reached according to equation (3). 404 is also shown in FIG. 5.

At 405, a next breakout backward pass is initiated starting from the next breakout period (e.g., s+1) and the scaled breakout backward probabilities are calculated again until the convergence time according to equations (12). 405 is also shown in FIG. 5.

At 406, the scaled breakout backward probabilities from 405 are compared to the scaled breakout backward probabilities calculated for the previous breakout periods up to the convergence time. In this pass, the scaled breakout backward probabilities calculated at 405 are compared to the scaled breakout backward probabilities calculated at 403 for FIG. 5 for each time instance. At 407, for each time instance, a determination is made as to whether the difference between corresponding values is less than or equal to epsilon. If yes, at 408, it is deemed that the breakout backward probabilities have converged and a convergence time point is set and stored. For example, starting from the time instance of the convergence, the next greater time instance is identified where the corresponding values are greater than epsilon. The time instance just before that is the new convergence time, which is set and stored. The forward probabilities and scaled backward probabilities are now accurately estimated up until the new convergence time and are stored and are used to calculate the accumulates for the HMM model parameters at 303 in the method 300. Future breakout backward passes are no longer processed beyond the new convergence time. The value for epsilon may be selected as appropriate for the desired accuracy of the parameters of the HMM being trained.

At 407, if the difference between corresponding values is not less than or equal to epsilon for any of the corresponding values, then a determination is made as to whether the last breakout period in the training data has been reached at 409. If yes, the method ends. If no, 404-407 are repeated for the next breakout period.

FIG. 5 shows an example where no convergence time is detected for the breakout backward pass from s+1 to 0. FIG. 5 shows some of the time periods for which forward and scaled breakout backward probabilities are calculated as described with respect to the method 400. For example, at 402 and 404 in the method 400, forward probabilities are calculated for the speech from 0 to "a" and from "a" to "b" respectively. At 403 and 405 in the method 400, scaled breakout backward probabilities are calculated for the speech from "a" to 0 and from "b" to 0 in the respective breakout backward passes.

In the example shown in FIG. 5, a convergence time 501 is also shown. For example, the convergence time 501 is detected based on scaled breakout backward probabilities calculated for the breakout backward pass 502 being compared to scaled breakout backward probabilities calculated for the breakout backward pass starting from "b" to identify a point where the difference is less than or equal to epsilon. FIG. 5 also shows that future breakout backward passes do not continue past the convergence time 501. For example, breakout backward pass 503 starting from "d" calculates scaled backward probabilities from "d" until the convergence time 501.

Multiple convergence times may be identified in the training data by the method 400 and future breakout backward passes do not continue past the most recent convergence time. The forward probabilities and scaled backward probabilities are stored until each new convergence time and are used to calculate the accumulates for the HMM model parameters at 303 in the method 300.

While the embodiments have been described with reference to examples, various modifications to the described embodiments may be made without departing from the scope of the claimed embodiments.

What is claimed is:

1. A speech recognition system comprising:
  data storage to store speech training data; and
  a training engine executed by a processor to:
    determine consecutive breakout periods in the speech training data,
    calculate forward and scaled backward probabilities for the breakout periods,
    determine a convergence time in the training data from some of the scaled backward probabilities, wherein the convergence time is when scaled backward probabilities calculated for some of the breakout periods stop changing,
    store forward and scaled backward probabilities for the convergence time in the data storage,
    generate a speech recognition Hidden Markov Model (HMM) from the forward and scaled backward probabilities calculated for the breakout periods, and
    use the convergence time as an end point for future breakout backward passes conducted for future breakout periods.

2. The speech recognition system of claim 1, wherein to determine the convergence time, the training engine is to:
  calculate a first set of the forward probabilities for a first breakout period of the breakout periods;
  calculate a first set of the scaled backward probabilities in a first breakout backward pass from an end of the first breakout period to a previous convergence time;
  calculate a second set of the forward probabilities for a second breakout period of the breakout periods;
  calculate a second set of the scaled backward probabilities in a second breakout backward pass from an end of the second breakout period to the previous convergence time; and
  determine the convergence time if a difference between the scaled backward probabilities in the second set and the first set is less than a threshold amount, wherein the convergence time is at or near a point in time in the training data where the difference is less than the threshold amount.

3. The speech recognition system of claim 1, comprising:
  a transcription engine to transcribe the training data to text using the speech recognition HMM.

4. The speech recognition system of claim 1, wherein the speech in the training data is greater than or equal to one hour in length and the consecutive breakout periods comprise consecutive time periods starting from a beginning of the speech to an end of the speech in the training data.

5. The speech recognition system of claim 1, wherein to generate the speech recognition HMM, the training engine is to:
- determine accumulates for the HMM from the stored forward and backward probabilities for the convergence time; and
- determine re-estimated values from the accumulates for the HMM.

6. A method of determining forward and backward probabilities for speech recognition, the method comprising:
- determining consecutive breakout periods in speech training data;
- calculating forward and scaled backward probabilities for the breakout periods;
- determining a convergence time in the training data from some of the scaled backward probabilities, wherein the convergence time is when scaled backward probabilities calculated for some of the breakout periods stop changing;
- storing forward and scaled backward probabilities for the convergence time generating a speech recognition Hidden Markov Model (HMM) from the forward and scaled backward probabilities calculated for the breakout periods; and
- using the convergence time as an end point for future breakout backward passes conducted for future breakout periods.

7. The method of claim 6, wherein determining a convergence time comprises:
- calculating a first set of the forward probabilities for a first breakout period of the breakout periods;
- calculating a first set of the scaled backward probabilities in a first breakout backward pass from an end of the first breakout period to a previous convergence time;
- calculating a second set of the forward probabilities for a second breakout period of the breakout periods;
- calculate a second set of the scaled backward probabilities in a second breakout backward pass from an end of the second breakout period to the previous convergence time; and
- determining the convergence time based on a comparison of values associated with the first set of scaled backward probabilities and a second set of the scaled backward probabilities.

8. The method of claim 7, wherein if a difference between the scaled backward probabilities in the second set and the first set is less than a threshold amount, then identifying the convergence time at or near that point in time in the first or second breakout period.

9. The method of claim 6, wherein generating a speech recognition Hidden Markov Model (HMM) from the forward and scaled backward probabilities calculated for the breakout periods comprises:
- determining accumulates for the HMM from the stored forward and scaled backward probabilities for the convergence time; and
- determining re-estimated values from the accumulates for the HMM.

10. A non-transitory computer readable medium including machine readable instructions executable by at least one processor to:
- determine consecutive breakout periods in speech training data;
- calculate forward and scaled backward probabilities for the breakout periods;
- determine convergence times in the training data from the backward probabilities, wherein each convergence time is when scaled backward probabilities calculated for some of the breakout periods stop changing;
- store forward and scaled backward probabilities for the convergence times; and
- generate a speech recognition Hidden Markov Model (HMM) from the forward and scaled backward probabilities determined for the convergence times.

11. The non-transitory computer readable medium of claim 10, wherein the machine readable instructions to determine convergence times comprise:
- calculate a first set of the forward probabilities for a first breakout period of the breakout periods;
- calculate a first set of the scaled backward probabilities in a first breakout backward pass from an end of the first breakout period to a previous convergence time;
- calculate a second set of the forward probabilities for a second breakout period of the breakout periods;
- calculate a second set of the scaled backward probabilities in a second breakout backward pass from an end of the second breakout period to the previous convergence time; and
- determine one of the convergence times if a difference between the scaled backward probabilities in the second set and the first set is less than a threshold amount, wherein the convergence time is at or near a point in time in the training data where the difference is less than the threshold amount.

12. The non-transitory computer readable medium of claim 10, wherein the machine readable instructions are executable by the at least one processor to:
- determining accumulates for the HMM from the stored forward and scaled backward probabilities for the convergence times; and
- determining re-estimated values from the accumulates for the HMM.

13. The non-transitory computer readable medium of claim 11, wherein the machine readable instructions are executable by the at least one processor to:
- transcribe speech in the training data using the HMM.

* * * * *